United States Patent Office 2,907,488
Patented Oct. 6, 1959

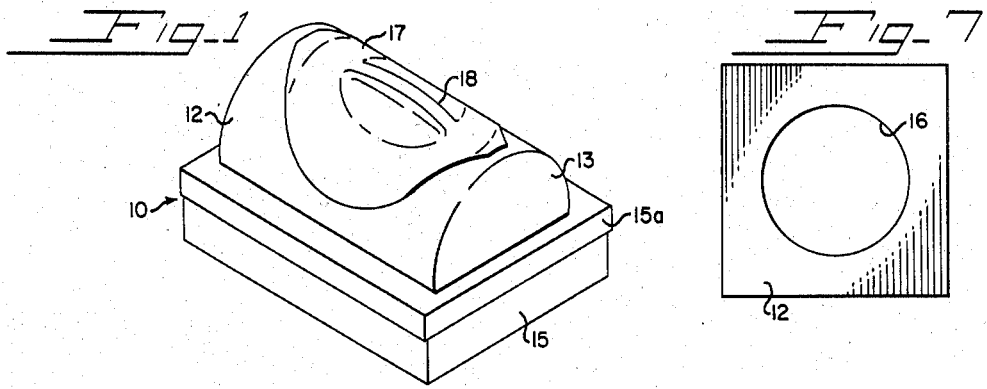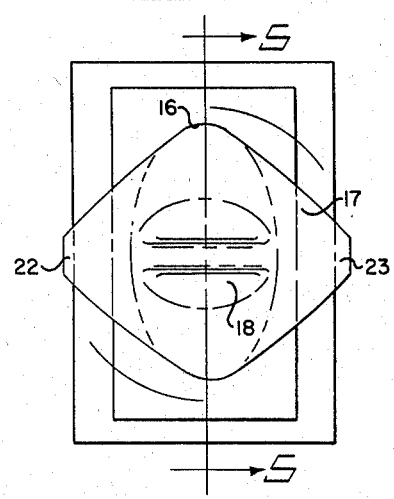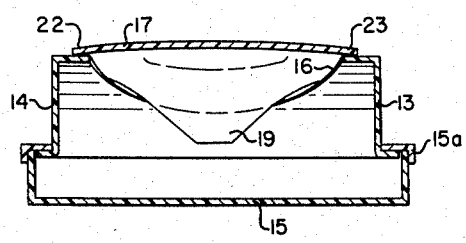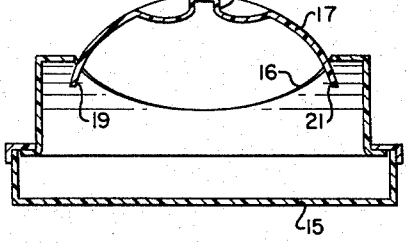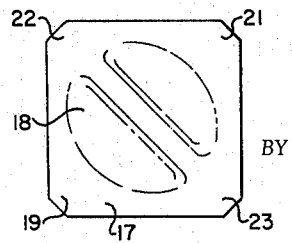
Oct. 6, 1959 — H. P. BOTTS — 2,907,488
ROTARY MOUNTING ARRANGEMENT
Original Filed April 9, 1957
INVENTOR.
HUGH P. BOTTS
BY Zugelter and Zugelter
Attys

2,907,488

ROTARY MOUNTING ARRANGEMENT

Hugh P. Botts, New York, N.Y.

Original application April 9, 1957, Serial No. 651,690, now Patent No. 2,867,925, dated January 13, 1959. Divided and this application October 15, 1957, Serial No. 690,376

1 Claim. (Cl. 220—24)

This invention relates to a rotary or pivotal mounting arrangement.

This is a division of my co-pending application Serial No. 651,690, filed April 9, 1957, which matured as Patent No. 2,867,925 on January 13, 1959.

An object of this invention is to provide a simple and inexpensive rotary or pivotal mounting which has no central pivot.

A further object of this invention is to provide a rotary or turnable closure for a container which can readily be turned between open and closed positions.

A still further object of this invention is to provide a simple closure for a curved wall of a container in which a rotary member may be turned between an open position and a closed position.

A further object of this invention is to provide a rotary connection which includes a rotary member of generally square shape which is received in a generally circular or curved opening with a pair of oppositely directed corners of the rotary member on one side of the wall of the opening and with a second pair of oppositely disposed corners or projections of the rotary member on the other side of the wall.

The above and other objects and features of this invention will be apparent to those skilled in the art to which this invention pertains from the following detailed description, and the drawing, in which:

Figure 1 is a perspective view showing a container provided with a rotary closure constructed in accordance with an embodiment of this invention;

Fig. 2 is a plan view of the container with the rotary closure in closed position;

Fig. 3 is a plan view of the container with the closure in open position;

Fig. 4 is a view in section taken on the line 4—4 in Fig. 2;

Fig. 5 is a view in section taken on the line 5—5 in Fig. 3;

Fig. 6 is a plan view of the rotary member of the closure removed therefrom;

Fig. 7 is a developed view of one wall of the container.

In the following detailed description, and the drawing, like reference characters indicate like parts.

In Figs. 1–7 inclusive is shown a closure constructed in accordance with an embodiment of this invention. In Figs. 1–5 inclusive, a container 10 is shown provided with a rigid, cylindrical wall 12. The cylindrical walled portion is closed by end plates 13 and 14. A rectangular open-topped box-bottom 15 is attached to the cylindrically walled portion by an angle-shaped connecting portion 15a. In the cylindrical wall 12, there is formed an opening 16 which is a complex curve. In Fig. 7, the wall 12 is shown developed. In the developed view, the opening 16 is circular in shape.

In the opening 16 is disposed a rotary closure member 17. As shown in Fig. 6, the closure member 17 is generally square in shape. The central portion thereof may be deformed, as indicated at 18, to form handle portions. The member 17 may be formed of resilient plastic material of the type known as Lucite or Plexiglas. This material, although resilient and somewhat elastic, will retain or tend to return to a shape to which it may be formed. The member 17 is formed to a curved shape generally approximating the curvature of the cylindrical wall 12, but with a somewhat greater radius of curvature when in released or relaxed position, as indicated most clearly in Figs. 4 and 5. The member 17 is mounted in the opening 16 with two oppositely extending corners 19 and 21 thereof inside the opening and the other two oppositely directed corners 22 and 23 on the outside thereof. When the rotary member is turned to the position indicated in Fig. 2, the corners of the rotary member firmly engage the cylindrical wall and form a relatively tight fitting closure for the opening. As shown, the edges of the rotary member substantially engage the edge of the circular opening intermediate the projections. If desired, a layer of resilient gasketing material (not shown) may be mounted on the rotary member or on the edge of the opening to improve the tightness of the closure. When the rotary member is turned approximately 90 degrees to the position shown in Figs. 3 and 5, the rotary member retains its generally curved condition and the opening of the cylindrical wall is exposed and open at the sides thereof. When the rotary closure member is in this position, it may readily be removed from the opening.

As shown in Fig. 6, the rotary member is substantially square in shape when in flattened or developed form. The corners may be beveled or cut away as shown to eliminate sharp points at the corners.

This construction forms a very convenient and readily operated closure for a container holding granular materials and the like. The rotary member may be made of transparent plastic material so that the contents of the container may be exposed therethrough.

The container wall 12 is shown circularly cylindrical, but may be of other appropriate curved or cylindrical shape.

The device illustrated in the drawing and described above, is subject to structural modification without departing from the spirit and scope of the appended claim.

Having described my invention, what I claim as new, and desire to secure by Letters Patent is:

A closure which comprises a wall member having edges therein forming an opening which, in developed form, is circular, said wall member being of cylindrical shape, a cylindrical plate-like rotary member of resilient material mounted in said opening, the radius of curvature of the rotary member normally being greater than that of the wall, said rotary member being substantially square and having a pair of oppositely disposed projections received on one side of the wall member and a second pair of oppositely disposed projections received on the other side of the wall member, each of the projections of the second pair being intermediate the projections of the first mentioned pair, edges of the rotary member being adapted to substantially engage the edge of the circular opening intermediate the projections when in closed position, the central portion of the rotary member forming a handle portion, the rotary member being turnable approximately 90° between the closed position in which the projections engage the wall member and a released position.

References Cited in the file of this patent

UNITED STATES PATENTS 2,113,288    Berger _____ Apr. 5, 1938

FOREIGN PATENTS 877,743    France _____ Sept. 14, 1942